United States Patent
Elliott et al.

(10) Patent No.: US 7,240,242 B2
(45) Date of Patent: *Jul. 3, 2007

(54) APPARATUS AND METHOD TO CONVERT DATA PAYLOADS FROM A FIRST SECTOR FORMAT TO A SECOND SECTOR FORMAT

(75) Inventors: John Charles Elliott, Tucson, AZ (US); Robert Akira Kubo, Tucson, AZ (US); Carl Evan Jones, Tucson, AZ (US); Gregg Steven Lucas, Tucson, AZ (US)

(73) Assignee: International Business Machines Corporation, NY (US)

( * ) Notice: Subject to any disclaimer, the term of this patent is extended or adjusted under 35 U.S.C. 154(b) by 512 days.

This patent is subject to a terminal disclaimer.

(21) Appl. No.: 10/912,973

(22) Filed: Aug. 5, 2004

(65) Prior Publication Data

US 2006/0031601 A1    Feb. 9, 2006

(51) Int. Cl.
    *G06F 11/00*    (2006.01)
(52) U.S. Cl. .......................... 714/22; 710/22
(58) Field of Classification Search ............. 714/22, 714/7; 710/22
    See application file for complete search history.

(56) References Cited

U.S. PATENT DOCUMENTS

| | | | | |
|---|---|---|---|---|
| 5,315,691 A | | 5/1994 | Sumiya et al. ............... 395/109 |
| 5,627,695 A | * | 5/1997 | Prins et al. .................... 360/51 |
| 5,928,367 A | | 7/1999 | Nelson et al. .................. 714/6 |
| 5,938,771 A | | 8/1999 | Williams et al. ............ 713/310 |
| 5,940,862 A | * | 8/1999 | Erickson et al. ............. 711/154 |
| 5,946,714 A | * | 8/1999 | Miyauchi ..................... 711/205 |
| 6,000,018 A | * | 12/1999 | Packer et al. ................ 711/154 |
| 6,357,028 B1 | * | 3/2002 | Zhu ............................. 714/751 |
| 6,574,699 B1 | * | 6/2003 | Dobbek ......................... 711/4 |
| 2002/0087786 A1 | * | 7/2002 | Burton et al. ................ 711/112 |
| 2006/0028947 A1 | * | 2/2006 | Elliott et al. ............. 369/53.41 |
| 2006/0028948 A1 | * | 2/2006 | Batchelor et al. ......... 369/53.41 |
| 2006/0031601 A1 | * | 2/2006 | Elliott et al. .................. 710/22 |
| 2006/0031630 A1 | * | 2/2006 | Batchelor et al. ........... 711/112 |
| 2006/0031714 A1 | * | 2/2006 | Batchelor et al. ............. 714/14 |

* cited by examiner

*Primary Examiner*—Dieu-Minh Le
(74) *Attorney, Agent, or Firm*—Chandler & Udall, LLP; Dale F. Regerlman

(57) ABSTRACT

The method forms a plurality of DMA data payloads each comprising a plurality of first sectors, and sends to a sector format conversion device one or more of those DMA data payloads. The method then overlays the (i)th DMA data payload onto part or all of a plurality of second sectors to form the (i)th converted DMA data payload, enqueues that (i)th converted DMA data payload in a data queue, transmits that (i)th converted DMA data payload to a data storage device, and writes the (i)th converted DMA data payload to an information storage medium.

25 Claims, 7 Drawing Sheets

APPARATUS AND METHOD TO CONVERT DATA PAYLOADS FROM A FIRST SECTOR FORMAT TO A SECOND SECTOR FORMAT

FIELD OF THE INVENTION

This invention relates to an apparatus and method to convert data payloads from a first sector format to a second sector format while preserving data integrity during a power loss.

BACKGROUND OF THE INVENTION

Data storage and retrieval systems are used to store information provided by one or more host computer systems. Such data storage and retrieval systems receive requests to write information to one or more secondary storage devices, and requests to retrieve information from those one or more secondary storage devices. Upon receipt of a write request, the system stores information received from a host computer in a data cache. In certain implementations, a copy of that information is also stored in a nonvolatile storage device. Upon receipt of a read request, the system recalls information from the one or more secondary storage devices and moves that information to the data cache. Thus, the system is continuously moving information to and from storage devices, and to and from the data cache.

If, however, the data disposed in the data cache is written in a first sector format, and if the data disposed in the one or more storage devices is written in a second sector format, then a sector format conversion device would be required between the data cache and the one or more storage devices. Applicants have found that what is needed is a sector format conversion device, and a method using that device, that converts data payloads from a first sector format to a second sector format while preserving data integrity during a power loss event. Applicants' apparatus and method convert data payloads from a first sector format to a second sector format while preserving data integrity during a power loss event. In certain embodiments, Applicants' apparatus and method are compliant with the Power Failure Warning protocols under the SFF-8045 Specification.

SUMMARY OF THE INVENTION

Applicants' invention includes an apparatus and method to convert data payloads from a first sector format to a second sector format while preserving data integrity during a power loss. The method provides an information storage and retrieval system which includes information comprising a plurality of first sectors written in a first sector format; a device controller; a data storage device, where that data storage device comprises an information storage medium comprising a plurality of second sectors each comprising a second sector format; a sector format conversion device comprising a data queue, a buffer, and nonvolatile memory; a communication link interconnecting the sector format conversion device and the device controller; where the sector format conversion device is interconnected with the data storage device.

The method further sets a power failure warning time interval, and forms a plurality of DMA data payloads each comprising a plurality of first sectors, where each of the plurality of DMA data payloads comprises a beginning logical block address an ending logical block address, and sends to the sector format conversion device one or more of those DMA data payloads.

The method then overlays the (i)th DMA data payload onto part or all of a plurality of second sectors to form the (i)th converted DMA data payload, enqueues that (i)th converted DMA data payload in the data queue, transmits that (i)th converted DMA data payload to the data storage device, and writes the (i)th converted DMA data payload to the information storage medium.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. The invention will be described as embodied in an information storage and retrieval system which includes two clusters, a plurality of host adapters, a plurality of device adapters, and a data cache. The following description of Applicant's method to preserve data integrity during a power loss is not meant, however, to limit Applicant's invention to data processing applications, as the invention herein can be applied to sector format conversion in general.

Figure 1:
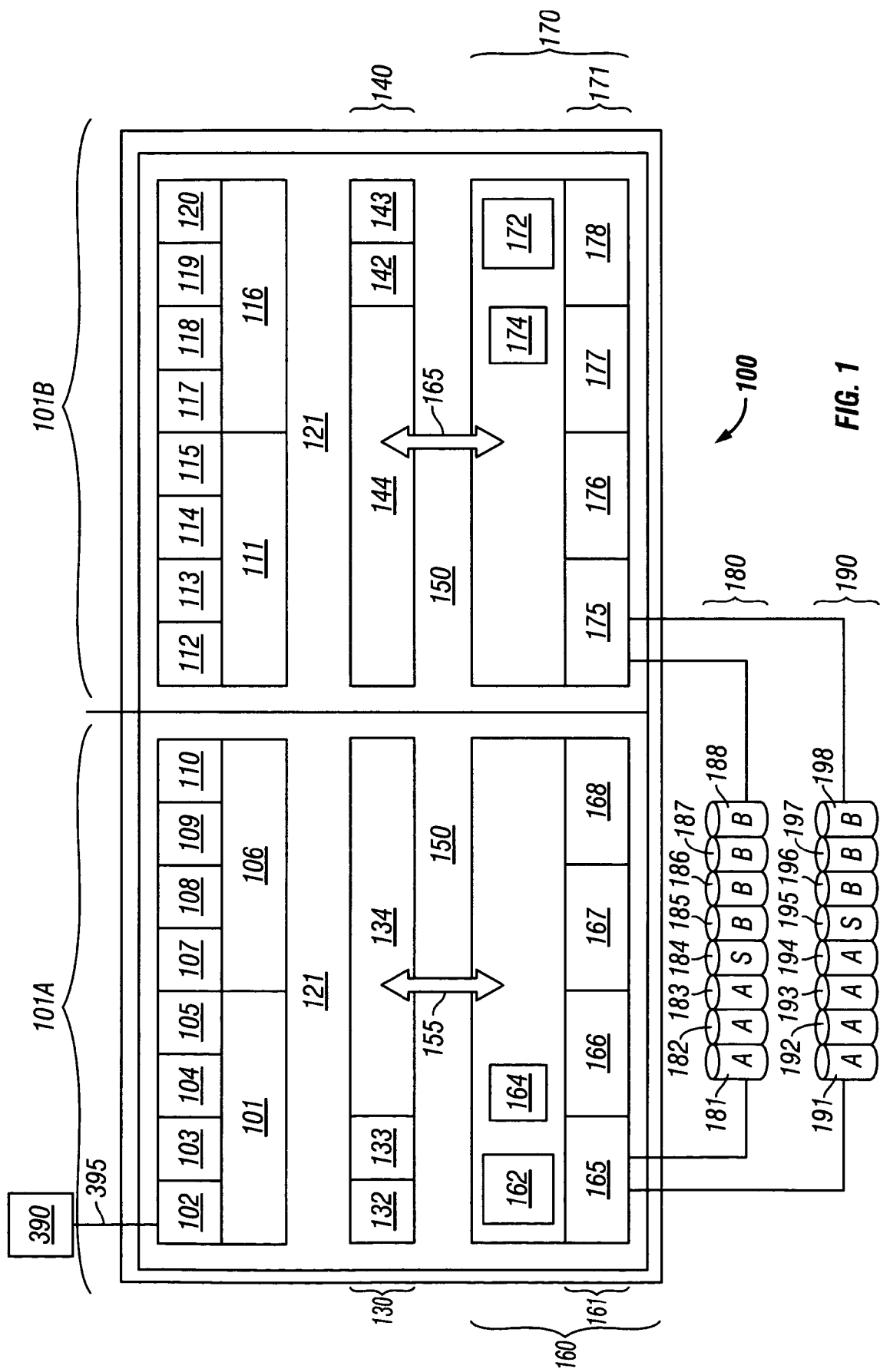
FIG. 1 is a block diagram showing one embodiment of Applicants' data storage and retrieval system.

Referring now to FIG. 1, information storage and retrieval system 100 is capable of communication with host computer 390 via communication link 395. The illustrated embodiment of FIG. 1 shows a single host computer. In other embodiments, Applicants' information storage and retrieval system is capable of communicating with a plurality of host computers.

Host computer 390 comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) In certain embodiments, host computer 390 further includes a storage management program. The storage management program in the host computer 390 may include the functionality of storage management type programs known in the art that manage the transfer of data to a data storage and retrieval system, such as the IBM DFSMS implemented in the IBM MVS operating system.

In certain embodiments, Applicants' information storage and retrieval system 100 includes a plurality of host adapters 102–105, 107–110, 112–115, and 117–120, disposed in four host bays 101, 106, 111, and 116. In other embodiments, Applicants' information storage and retrieval system includes fewer than 16 host adapters. Regardless of the number of host adapters disposed in any embodiments of Applicants' system, each of those host adapters comprise a shared resource that have equal access to both central processing/cache elements 130 and 140. Each host adapter may comprise one or more Fibre Channel ports, one or more FICON ports, one or more ESCON ports, or one or more SCSI ports. Each host adapter is connected to both clusters through interconnect bus 121 such that each cluster can handle I/O from any host adapter.

Processor portion 130 includes processor 132 and cache 134. In certain embodiments, processor portion 130 further includes memory 133. In certain embodiments, memory device 133 comprises random access memory. In certain embodiments, memory device 133 comprises non-volatile memory.

Processor portion 140 includes processor 142 and cache 144. In certain embodiments, processor portion 140 further includes memory 143. In certain embodiments, memory device 143 comprises random access memory. In certain embodiments, memory device 143 comprises non-volatile memory.

I/O portion 160 comprises a plurality of device adapters, such as device adapters 165, 166, 167, and 168. I/O portion 170 further comprises a plurality of device adapters, such as device adapters 175, 176, 177, and 178.

In certain embodiments of Applicants' system, one or more host adapters, processor portion 130, and one or more device adapters, are packaged together on a single card disposed in Applicants' information storage and retrieval system. Similarly, in certain embodiments, one or more host adapters, processor portion 160, and one or more device adapters, are disposed on another card disposed in Applicants' information storage and retrieval system. In these embodiments, Applicants' system 100 includes two cards interconnected with a plurality of data storage devices.

In the illustrated embodiment of FIG. 1, sixteen data storage devices are organized into two arrays, namely array "A" and array "B". The illustrated embodiment of FIG. 1 shows two storage device arrays. In other embodiments, Applicants' information storage and retrieval system includes more than two storage device arrays. Each storage array appears to a host computer as one or more logical devices.

In certain embodiments, one or more of the data storage devices comprise a plurality of hard disk drive units. In the illustrated embodiment of FIG. 1, disk array "A" includes disk drives 181, 182, 183, 191, 192, 193, and 194. Disk array "B" includes disk drives 185, 186, 187, 188, 196, 197, and 198. In certain embodiments, arrays "A" and "B" utilize a RAID protocol. In certain embodiments, arrays "A" and "B" comprise what is sometimes called a JBOD array, i.e. "Just a Bunch Of Disks" where the array is not configured according to RAID. As those skilled in the art will appreciate, a RAID (Redundant Array of Independent Disks) rank comprises independent disk drives configured in an array of disk drives to obtain performance, capacity and/or reliability that exceeds that of a single large drive.

The illustrated embodiment of FIG. 1 shows two storage device arrays. In other embodiments, Applicants' system includes a single storage device array. In yet other embodiments, Applicants' system includes more than two storage device arrays.

Figure 2:
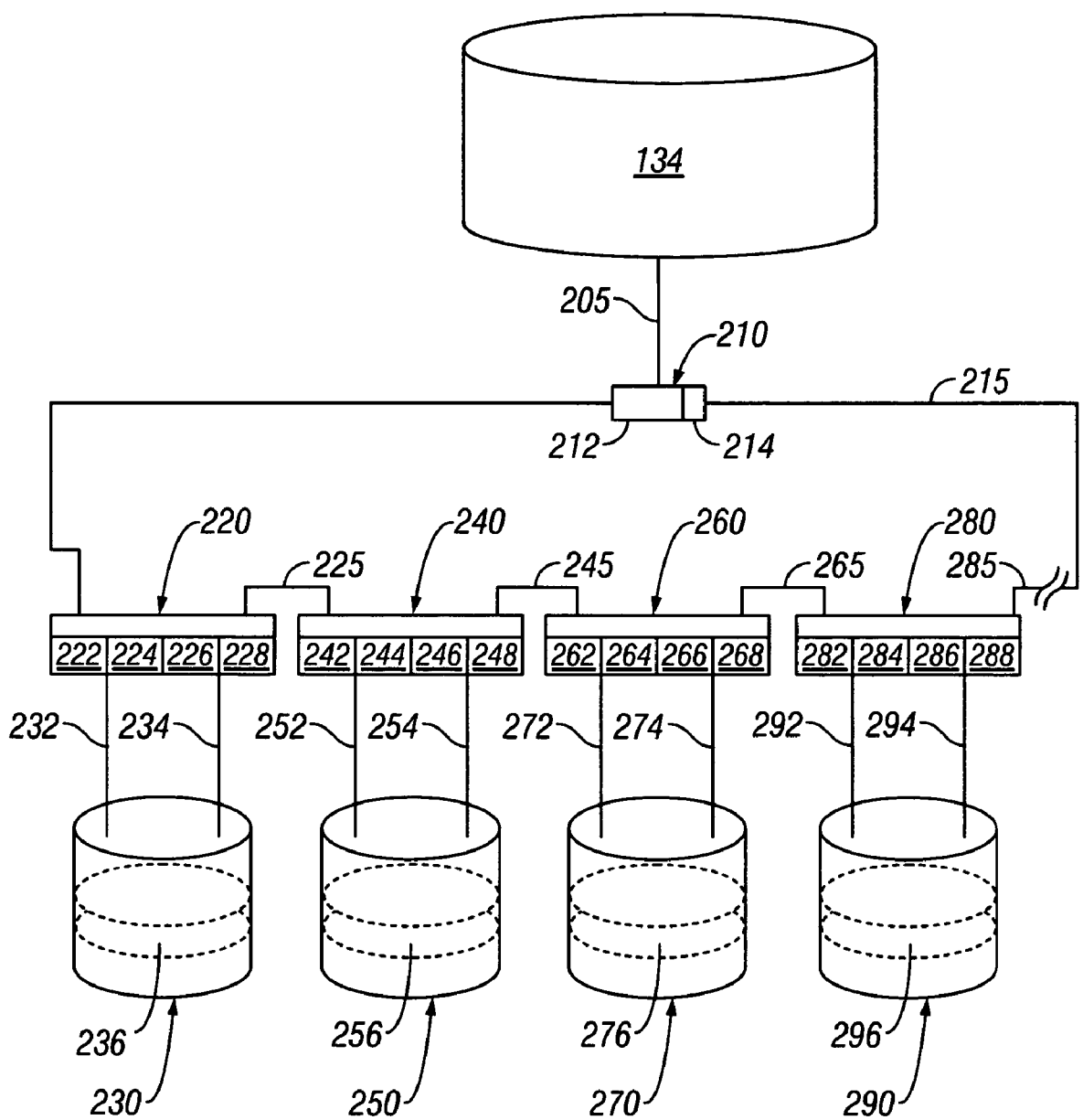
FIG. 2 is a block diagram showing a plurality of sector format conversion devices interconnecting a plurality of data storage devices to a controller.

Referring now to FIG. 2, regardless of the data storage media used in Applicants' information storage and retrieval system, e.g. a plurality of hard disks, each data storage device, which includes one or more of those storage media, is interconnected to a device controller 210 by a communication link 215. In certain embodiments, controller 210 includes a processor 212 and a memory 214. In certain embodiments, memory 214 comprises non-volatile memory.

In certain embodiments, device controller 210 comprises a device adapter, such as for example device adapter 165 (FIG. 1). In certain embodiments, device controller 210 comprises a RAID controller. In certain embodiments, communication link 215 comprises a Fibre Channel Arbitrated Loop. In the illustrated embodiment of FIG. 2, communication link 215 includes link segments 225, 245, 265, and 285.

The loop structure shown in FIG. 2 comprises one embodiment of Applicant's system. In other embodiments, link 215 comprises a switched fabric or a combination of a switch and loop topologies. In other embodiments, link 215 comprises dual FC-AL loops of switches where the device controller 210 is connected to two FC-AL loops. Each loop contains one or more Fibre Channel switches. The conversion devices 220, 240, etc connect point to point to switches on each loop. In other embodiments, each loop contains a single conversion device that performs a switching function that surfaces multiple point to point devices on each loop.

In some embodiments the conversion device, includes elements to perform sector size conversion from a first sector format to a second sector format ("sector size conversion"), where the communication protocol is the same for the first sector format and the second sector format. In other embodiments, the conversion device includes elements to perform both "sector size conversion" and a conversion from a first communication protocol to a second communication protocol ("protocol conversion"). In some embodiments the first communication protocol is a Fibre Channel Protocol and the second communication protocol is Serial ATA or ATA. In other embodiments, the first communication protocol is Serial Attached SCSI and the second communication protocol is Serial ATA or ATA.

In all embodiments, Applicants' sector format conversion device is capable of sector size conversion. In certain embodiments, Applicants' sector format conversion device is also capable of protocol conversion. References herein to sector format conversion device include devices capable of sector format conversion, and also to devices capable of sector format conversion and protocol conversion.

Each storage device is interconnected to communication link 215 by a sector format conversion device, such as devices 220, 240, 260, and 280, which interconnect storage devices 230, 250, 270, and 290, respectively, to communication loop 215. Sector format conversion device 220 interconnects storage device 230 to loop 215 by communication link 232.

Communication link 225 interconnects sector format conversion device 220 and sector format conversion device 240. Sector format conversion device 240 interconnects storage device 250 with loop 215 by communication link 252. Communication link 245 interconnects sector format conversion device 240 and sector format conversion device 260.

Sector format conversion device 260 interconnects storage device 270 to loop 215 by communication link 272.

Communication link 265 interconnects sector format conversion device 260 and sector format conversion device 280. Sector format conversion device 280 interconnects storage device 290 to loop 215 by communication link 292. Communication link 285 interconnects sector format conversion device 280 and communication loop 215. Communication links 232, 252, 272, and 292, are individually selected from a native drive line such as ATA or S-ATA.

Each sector format conversion device includes a data buffer, such as data buffers 222, 242, 262, and 282. Each sector format conversion device further includes a processor, such as processor 224, 244, 264, and 284. Each sector format conversion device further includes a persistent memory, such a persistent memory 226, 246, 266, and 286. By persistent memory, Applicants mean non-volatile memory, i.e. memory that survives a loss of utility power. In certain embodiments, nonvolatile memory devices 226, 246, 266, and 286, are each individually selected from the group which includes one or more EEPROMs (Electrically Erasable Programmable Read Only Memory), one or more flash memories, battery backup RAM, hard disk drive, combinations thereof, and the like. In certain embodiments, each sector format conversion device further includes a data queue, such as data queue 228, 248, 268, and 288.

In certain embodiments, data received from one or more host computers is initially written to a data cache, such as for example data cache 134 (FIG. 1), disposed in Applicants' information storage and retrieval system, such as system 100 (FIG. 1). In certain embodiments, that data is written to the data cache using a first sector format. In certain embodiments, a host computer writes the data to the storage subsystem using a block storage protocol over link 395 using a sector size other than the native sector size of the disk. In other embodiments, the storage subsystem adds its own data to the data written by the host to generate is own sector size. This is done by prepending and/or appending data to the sector for cases where the host is using a blocked based protocol like SCSI or by breaking a record based data such as ECKD data formats used by zSeries systems into fixed block sectors In certain embodiments, that first sector format comprises 520 bytes of data per sector. In certain embodiments, that first sector format comprises 524 bytes of data per sector. In certain embodiments, that first sector format comprises 528 bytes of data per sector. In certain embodiments of Applicants' method, before providing data to one or more attached storage devices, converts data from the afore-described first sector format to a second sector format. In certain embodiments, that second sector format comprises 512 bytes of data per sector.

Figure 3:
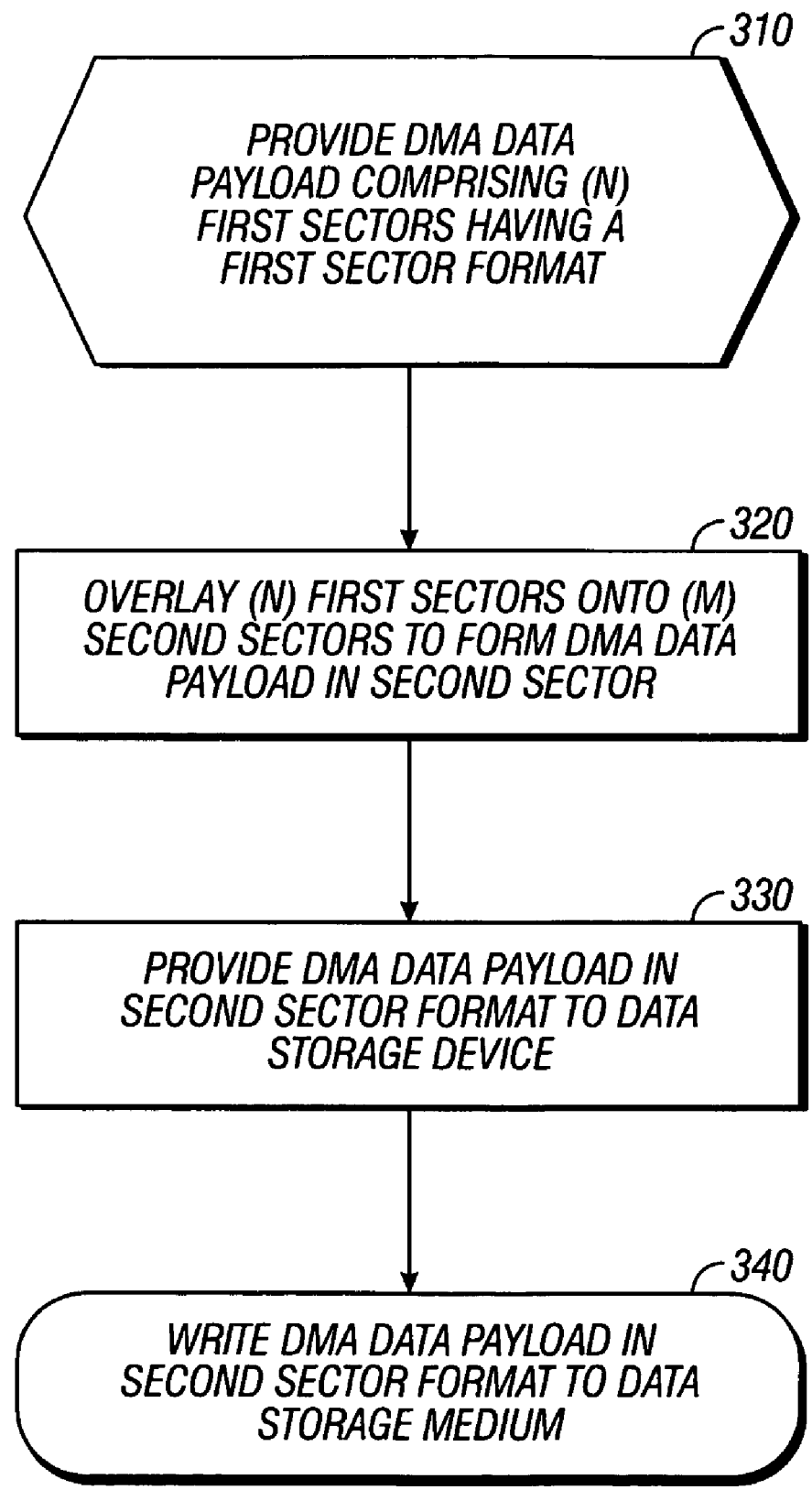
FIG. 3 is a flow chart summarizing a first embodiment of Applicants' method.

FIG. 3 summarizes the steps of Applicants' method to convert data from a first sector format to a second sector format. In step 310, Applicants' method provides a direct memory access ("DMA") data payload comprising (N) first sectors. By "first sector," Applicants mean a sector comprising data written in a first sector format. In certain embodiments, that first sector format comprises 520 byte sectors. In other embodiments, that first sector format comprises 524 byte sectors. In still other embodiments, that first sector format comprises 528 byte sectors.

In certain embodiments, the DMA data payload comprising (N) first sectors is provided to a sector format conversion device, such as device 220 (FIG. 2), disposed in an information storage and retrieval system, such as for example system 100 (FIG. 1), by one or more host computers, such as for example host computer 390 (FIG. 1). In certain embodiments, the DMA data payload comprising (N) first sectors is provided to a sector format conversion device, such as device 220 (FIG. 2) disposed in an information storage and retrieval system, such as for example system 100 (FIG. 1), from a data cache disposed within that same information storage and retrieval system, such as for example data cache 134 (FIGS. 1, 2).

In step 320, Applicants' method converts the DMA data payload comprising (N) first sectors to a converted DMA data payload comprising (M) second sectors. By "second sector," Applicants mean a sector comprising data written in a second sector format. In certain embodiments, that second sector format comprises 512 byte sectors. In certain embodiments, step 320 is performed by a sector format conversion device, such as device 220 (FIG. 2). As those skilled in the art will appreciate, if the first sector format comprises (X) bytes per sector and if the second sector format comprises (Y) bytes per sector, where (X) is greater than (Y), then (N) is less than (M). Alternatively, if (X) is less than (Y), then (N) is greater than (M).

In certain embodiments Applicants' method in step 320 converts the DMA data payload provided in step 310 from the first sector format to a converted DMA data payload comprising data written in the second sector format. In certain embodiments, step 320 forms the converted DMA data payload using an overlay operation.

Figure 5:
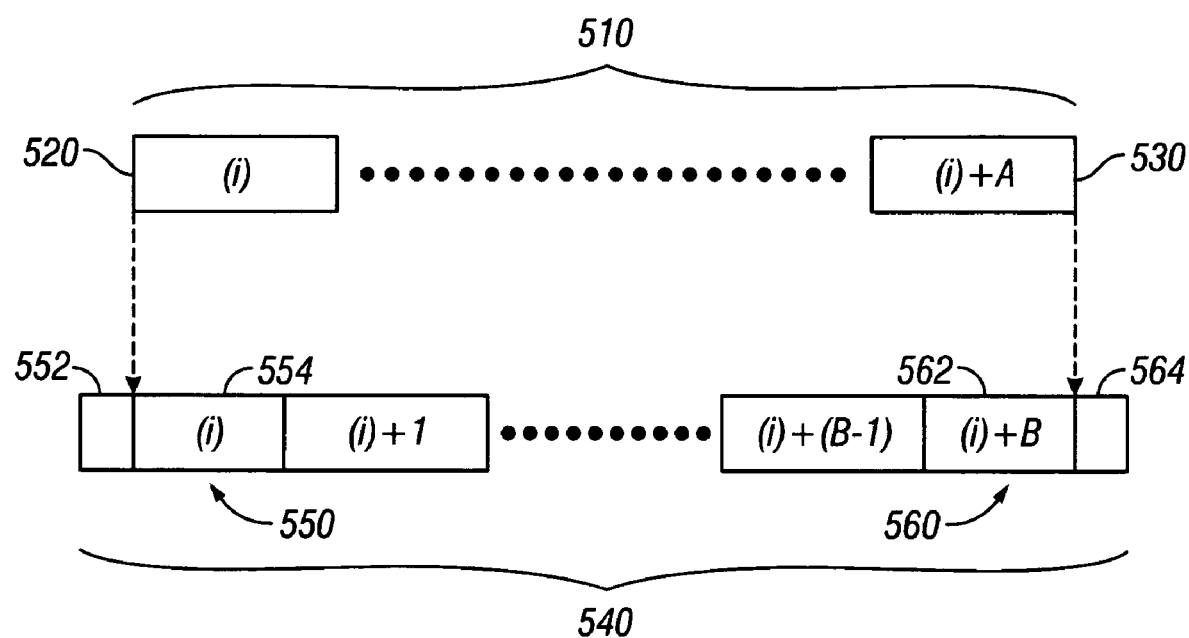
FIG. 5 is a block diagram showing the mapping of a DMA data payload comprising a plurality of sectors written in a first sector format onto a plurality of sectors having a second sector format.

Referring now to FIGS. 3 and 5, in step 310 Applicants' method provides a parent DMA data payload, i.e. DMA data payload 510, comprising data written to a total of A+1 contiguous first sectors. Providing contiguous first sectors further provides order dependent data to correctly build the parent DMA data payload. This data comprising the parent DMA payload may reside on a data cache, in a host computer, or may be generated in a previous operation.

In step 320, Applicants' method overlays the parent DMA data payload received in step 310 onto a plurality of contiguous second sectors to form converted DMA data payload 540. In step 320, Applicants' method prefetches and reads only the beginning second sector, i.e. sector 550, and the ending second sector, i.e. sector 560, prior to overlaying DMA data payload 510 onto the plurality of contiguous second sectors to form converted DMA data payload 540. In certain embodiments, step 320 is performed by a sector format conversion device, such as device 220 (FIG. 2).

The following Example I is presented to further illustrate to persons skilled in the art how to make and use the invention and to identify a presently preferred embodiment thereof. This example is not intended as a limitation, however, upon the scope of the invention, which is defined only by the appended claims.

EXAMPLE I

In this Example I, DMA payload 510 comprises about 8.4 kilobytes of data. Further in this Example, the first sector format comprises about 524 bytes per sector. In this Example I then, DMA payload 510 comprises about 16 first sectors, i.e. "A" in FIG. 5 equals 15. DMA data payload 510 begins with the (i)th first sector, i.e. sector 520 written in the first sector format, and ends with the (i)+15$^{th}$ first sector, i.e. sector 530 written in the first sector format.

In this Example I, the second sector format comprises 512 byte sectors. Further in this Example, converted DMA data payload 540 comprises about 8.4 kilobytes of data. Therefore in this Example I, converted DMA data payload 540 includes about 16.4 contiguous second sectors. Thus in this Example I, converted DMA data payload 540 begins with the (j)th sector written in the second sector format, i.e. sector 550, and extends into the 17$^{th}$ contiguous second sector, i.e. second sector 560.

Using this Example and again referring to the illustrated embodiment of FIG. 5, the (j)th second sector, i.e. sector 550, which begins converted DMA data payload 540, includes two data portions, namely data portion 552 and data portion 554. Data portion 552 includes "old" data, i.e. data previously written to sector 550. Data portion 554 comprises "new" data written to sector 550 as the beginning portion of DMA data payload 540.

Similarly, referring again to the illustrated embodiment of FIG. 5, the (j)th+16 second sector, i.e. sector 560, which ends converted DMA payload 540, includes two data portions, namely data portion 562 and data portion 564. Data portion 562 includes "new" data written, written to sector 560 and data portion 564 that includes "old" data, i.e. data previously written to sector 550 as the ending portion of DMA data payload 540.

As with any data storage and retrieval system, it is a requirement to maintain the stored data consistent with the host's view of the operations. The ordering of the operations must be maintained such that data is applied to the storage device in the sequence that it is written by the host to the data storage and retrieval system. Therefore, the "old" data that is used in the formation of the DMA data payloads must take into consideration what data will be written to the storage device by the enqueued operations that were previously formed and use the appropriate data (data from a previously enqueued operation or data that is fetched from the storage device) to maintain the consistency of the data from the host's perspective.

Referring again to FIG. 3, in step 330 Applicants' method provides the converted DMA data payload formed in step 320 to a target storage device, such as storage device 230 (FIG. 2). In step 340, the target storage device writes the converted DMA data payload, in second sector format, to a storage medium disposed in the data storage device.

In certain embodiments, the DMA data payload of step 310 is received by a sector format conversion device, such as device 220, and stored in a buffer, such as buffer 222, disposed within that sector format conversion device. In certain embodiments, in step 330 the converted DMA data payload is provided to the storage device substantially synchronously with the sector conversion of step 320. In other embodiments, the converted DMA data payload is enqueued for later transmission to the storage device.

Figure 4:
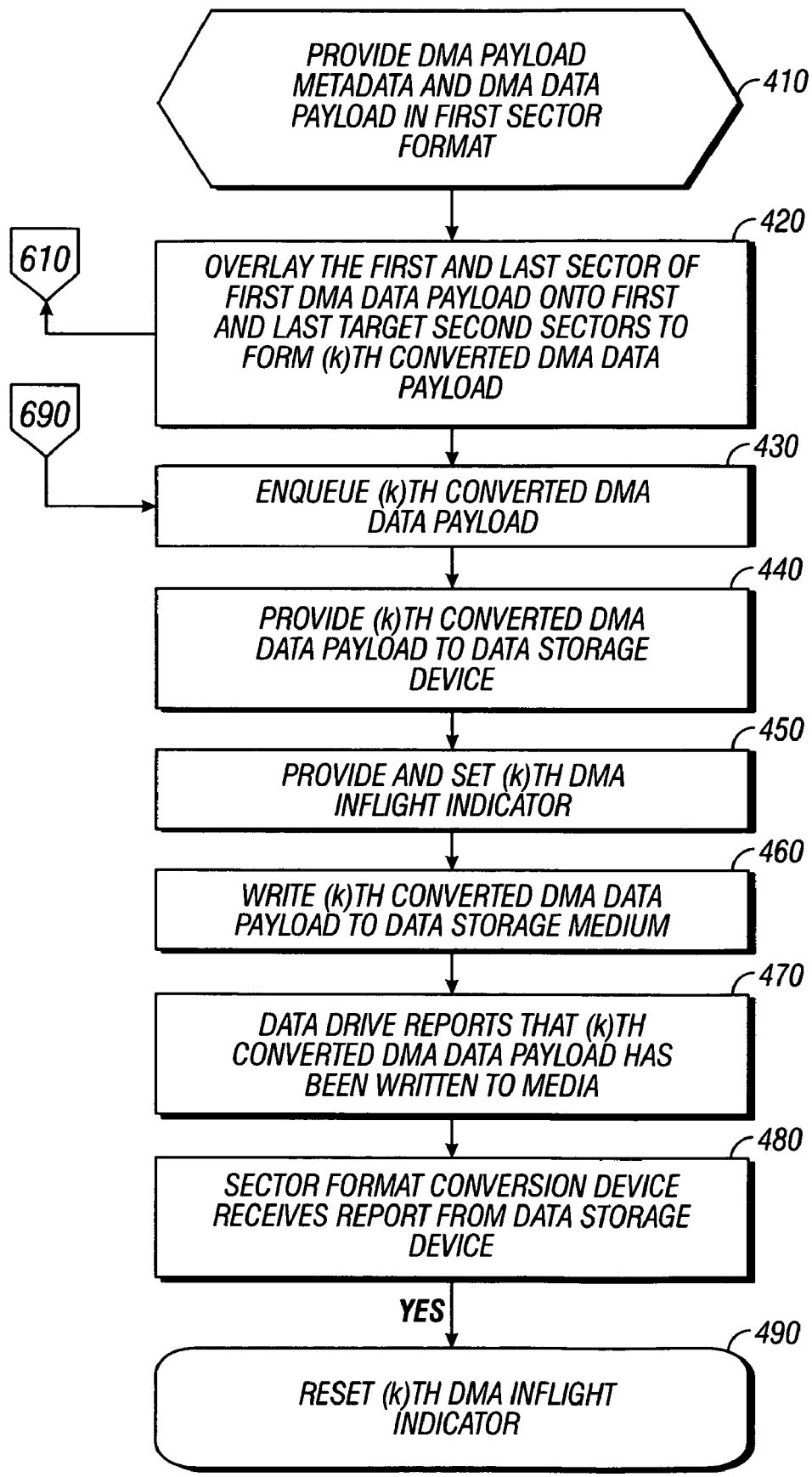
FIG. 4 is a flow chart summarizing a second embodiment of Applicants' method.

In certain embodiments, the method of FIG. 3 is implemented using the steps shown in FIG. 4. In step 410, Applicants' method provides a DMA data payload, such as for example DMA data payload 510 (FIG. 5), comprising a plurality of contiguous first sectors.

In certain embodiments, in step 410 a controller, such as controller 210 (FIG. 2) retrieves the (i)th through and including the (i)th+A first sectors from data cache 134 (FIGS. 1, 2) via communication link 205. As those skilled in the art will appreciate, each of that plurality of first sectors has a beginning and an ending Logical Block Address on that data cache. Further in step 410, the controller, such as controller 210 (FIG. 2), provides that plurality of first sectors to a sector format conversion device. In certain embodiments, the receiving sector format conversion device stores the DMA data payload in a buffer, such as for example buffer 222 (FIG. 2).

In step 420, Applicants' method overlays the DMA data payload of step 410 onto a plurality of contiguous second sectors, as described above in conjunction with step 320 (FIG. 3), to form the (k)th converted DMA data payload. In certain embodiments, step 420 is performed by a sector format conversion device, such as device 220 (FIG. 2).

In step 430, Applicants' method enqueues the (k)th converted DMA data payload of step 420. In certain embodiments, step 430 includes enqueuing the (k)th converted DMA data payload in a queue, such as queue 228, disposed in a sector format conversion device, such as device 220. In certain embodiments, step 430 is performed by a sector format conversion device, such as device 220.

In step 440, Applicants' method provides the (k)th converted DMA data payload formed in step 420 from the queue, such as queue 228, to a target data storage device, such as data storage device 230. In certain embodiments, step 440 is performed by a sector format conversion device, such as device 220.

In step 450, Applicants' method provides and sets the (k)th Inflight Indicator to indicate that the (k)th converted DMA data payload is In Flight. For purposes of this Application, an "In Flight" DMA data payload is a converted DMA data payload provided to a target data storage device for which a Write Complete signal has not yet been received.

In certain embodiments, Applicants' method creates a discrete Inflight Indicator for each converted DMA data payload provided to a data storage device. In certain embodiments, Applicants' Inflight Indicator comprises a flag which can be turned on or off. In certain embodiments, such a flag is disposed in device microcode disposed in the sector format conversion device. In certain embodiments, Applicants' Inflight Indicator comprises a bit which can be set to either "0" or to "1". In certain embodiments, such a bit is disposed in device microcode disposed in the sector format conversion device. Further in step 450, Applicants' method sets the (k)th Inflight Indicator, i.e. the Inflight Indicator associated with the (k)th converted DMA data payload, to show that the (k)th converted DMA data payload is "In Flight." In certain embodiments, step 450 is performed by a sector format conversion device, such as device 220.

In certain embodiments, steps 440 and 450 are performed substantially synchronously. In other embodiments, step 440 precedes step 450. In yet other embodiments, step 450 precedes step 440.

In step 460, the target data storage device, such as data storage device 230, receives the (k)th converted DMA data payload and writes that (k)th converted DMA data payload to a data storage medium disposed therein, such as data storage medium 236.

In step 470, the target data storage device reports that the (k)th converted DMA data payload has been written to media. This reporting may comprise any signaling method known to those of skill in the art. For example, the target data storage drive may be coupled to the issuing sector format conversion device through a communication interface. In certain embodiments, the target data storage drive provides a Write Complete Signal to the issuing sector format conversion device. Alternatively, in certain embodiments the issuing sector format conversion device polls the target data storage device to ascertain the status of the (k)th converted DMA data payload.

In step 480, Applicants' sector format conversion device receives the report from the target data storage device that the (k)th converted DMA data payload has been written to media. In certain embodiments, steps 470 and 480 occur substantially synchronously.

In step 490, Applicants' method resets the (k)th Inflight Indicator to show that the (k)th DMA data payload has been written to media. In certain embodiments, step 490 includes deleting the (k)th Inflight Indicator. In other embodiments, step 490 includes setting the (k)th In Flight bit from a "1" to a "0". In yet other embodiments, step 490 includes turning off the (k)th Inflight Indicator flag.

Applicants' method of FIG. 4 performs a plurality of steps synchronously. For example, DMA data payloads in the first sector format are being converted into DMA data payloads having the second sector format in step 420, while at the same time previously converted DMA data payloads are enqueued in step 430, while at the same time converted DMA payloads are being provided to one or more data storage devices in step 440, while at the same time enqueued DMA data payloads are being written to one or more storage media in step 460 by one or more data storage devices, while at the same time in step 470 one or more data storage devices are providing write complete signals.

Applicants' method to convert DMA data payloads from a first sector format into converted DMA data payloads comprising a second sector is compliant with Section 6.4.8.2., entitled "Power Failure Warning," of SFF Specification SFF-8045 (hereinafter referred to as the "PFW Specification," which is hereby incorporated by reference. As those skilled in the art will appreciate, the SFF Committee is an ad hoc group formed to address disk industry needs in a prompt manner. When formed in 1990, the original goals were limited to defining de facto mechanical envelopes for disk drives so they could fit into laptop computers and other small products. In November 1992, the SFF Committee objectives broadened to encompass other areas which needed prompt industry action. SFF Specifications are narrow in scope, to reduce development time. Among other requirements, the PFW Specification mandates that when write caching, a data storage device must stop writing data to nonvolatile storage on a block boundary.

In certain embodiments, one or more of Applicants' data storage devices, such as for example data storage device 230, comprises what is sometimes referred a "S-ATA" device. As those skilled in the art will appreciate, a S-ATA device employs a Serial ATA disk-interface technology.

S-ATA is based upon serial signaling technology. Serial ATA is a point-to-point connection and allows multiple ports to be aggregated into a single controller, such as for example controller 210 (FIG. 2). SATA storage devices do not necessarily support the PFW Specification. Applicants' method is PFW Specification compliant, even when using one or more S-ATA storage devices.

In the event a PFW signal is received by Applicants' apparatus while forming converted DMA data payloads and/or processing those converted DMA data payloads, Applicants' method transitions to a PFW algorithm. Using that PFW algorithm, after receiving a PFW signal, Applicants' method initiates a PFW time interval, completes the transmission of an already converted DMA data payload, while continuing to send previously converted DMA data payloads to data storage devices as possible during the PFW time interval. Upon expiration of the PFW time interval, Applicants' method saves the DMA payload metadata for each DMA data payload that remained In Flight at the time the PFW time interval expired.

Figure 6:
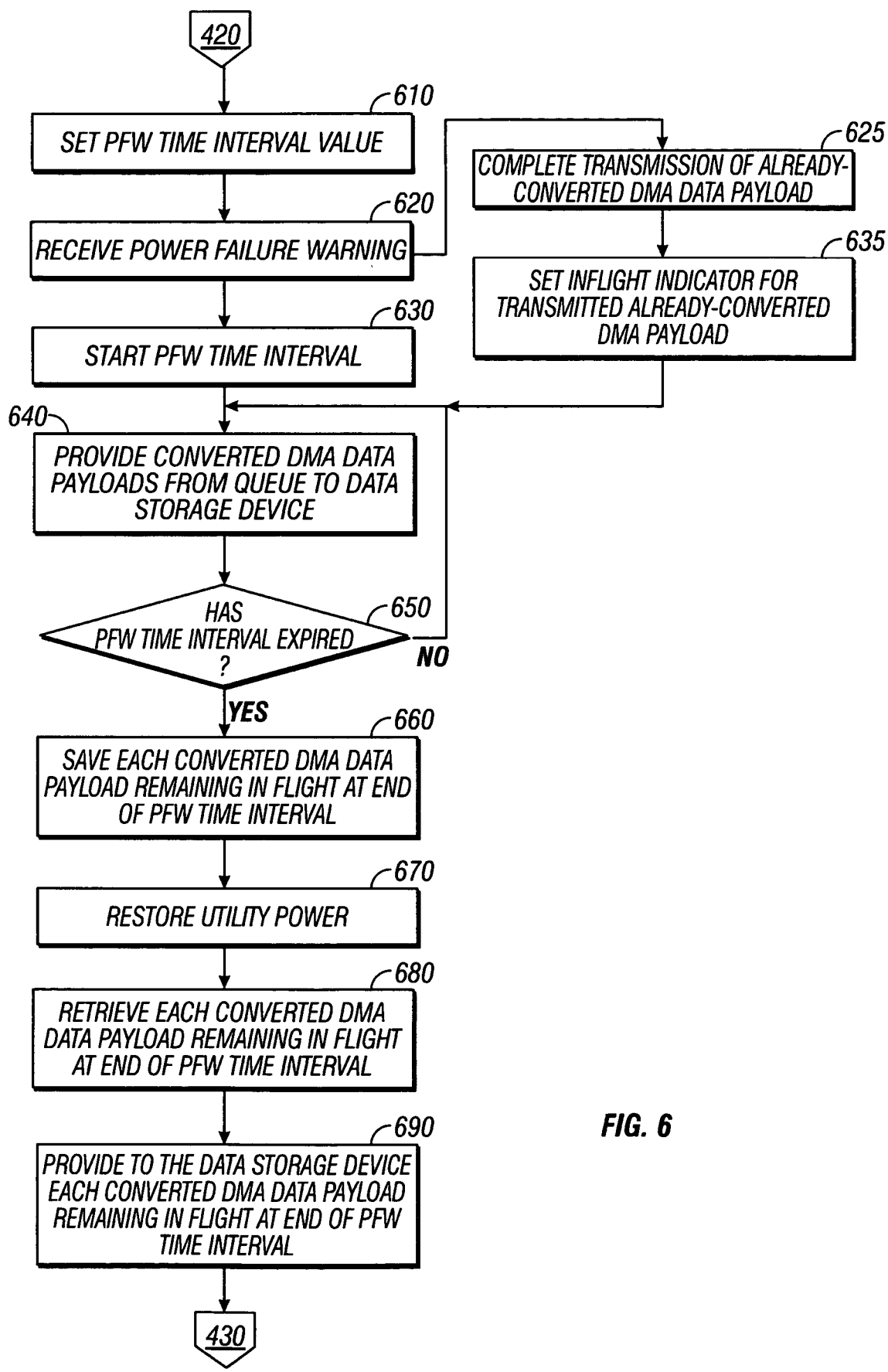
FIG. 6 is a flow chart summarizing the steps of Applicants' Power Warning Failure algorithm.

In the event Applicants' apparatus generates and/or receives a PFW signal while performing the method of FIG. 4, Applicant's method transitions to Applicants' PFW algorithm. Applicants' PFW algorithm is summarized in FIG. 6. Referring now to FIGS. 4 and 6, Applicants' method transitions to step 610 upon detection of a PFW signal. Step 620 includes receiving that PFW signal.

FIG. 4 shows Applicants' method transitioning from step 420 to step 610. As noted above, Applicants' method may be performing steps 410, 420, 430, 440, 450, 460, 470, 480, and/or 490, synchronously. If any one or more of steps 410, 420, 430, 440, 450, 460, 470, 480, and/or 490, are being performed and a PFW signal is received, Applicants' method transitions to step 610.

In step 610, Applicants' method sets a power failure warning time interval. The PFW Specification requires, inter alia, that full power be provided to the one or more data storage devices for at least 4 milliseconds after assertion of the PFW signal. In certain embodiments of Applicants' method, the PFW time interval is set to be less than 4 milliseconds. In certain embodiments, Applicants' method sets the PFW time interval to be about 3 milliseconds. During this PFW time interval, Applicants' method completes the in-progress transmission of an already-converted DMA payload while providing as many converted DMA data payloads as possible to one or more data storage devices.

In the illustrated embodiment of FIG. 6, step 610 is shown preceding receipt of a PFW signal in step 620. In certain embodiments, step 610 may be performed at any time before receipt of a PFW signal. In certain embodiments, the PFW time interval is encoded in firmware disposed in Applicants' sector format conversion device. In certain embodiments, the PFW time interval is set during system startup. In certain embodiments, the PFW time interval is adjustable by the system owner/operator.

In certain embodiments, step 610 is performed substantially synchronously with the receipt of the PFW signal in step 620. In these embodiments, upon receipt of a PFW signal, Applicants' method immediately determines the number of enqueued converted DMA data payloads and determines system capabilities, such as device adapter bandwidth. Based upon these determinations, Applicants' method sets an appropriate PFW time interval. In these synchronous embodiments, step 610 is performed by a sector format conversion device, such as device 220 (FIG. 2).

After receiving a PFW signal in step 620, Applicants' method transitions to both step 625 and step 630. In step 630, Applicants' method starts the PFW time interval set in step 610. In certain embodiments, step 630 is performed by a sector format conversion device, such as device 220 (FIG. 2). Applicants' method transitions from step 630 to step 640.

In step 625, Applicants' method completes the transmission of an already-converted DMA data payload. In certain embodiments, step 625 is performed by a sector format conversion device, such as device 220 (FIG. 2). Applicants' method transitions from step 625 to step 635 wherein the method sets an Inflight Indicator for the DMA data payload of step 625. In certain embodiments, step 635 is performed by a sector format conversion device, such as device 220 (FIG. 2). Applicants' method transitions from step 635 to step 640.

In step 640, Applicants' method continues to provide converted DMA data payloads from the data queue, such as queue 228 (FIG. 2), to one or more target data storage devices, such as data storage device 230 (FIG. 2). In certain embodiments, step 640 further includes determining the number (P) enqueued converted DMA data payloads when the PFW signal is received in step 620. In certain embodiments, step 640 is performed by a sector format conversion device, such as device 220 (FIG. 2).

The following Example is presented to further illustrate to persons skilled in the art how to make and use the invention and to identify a presently preferred embodiment thereof. This example is not intended as a limitation, however, upon the scope of the invention, which is defined only by the appended claims.

EXAMPLE II

Figure 7:
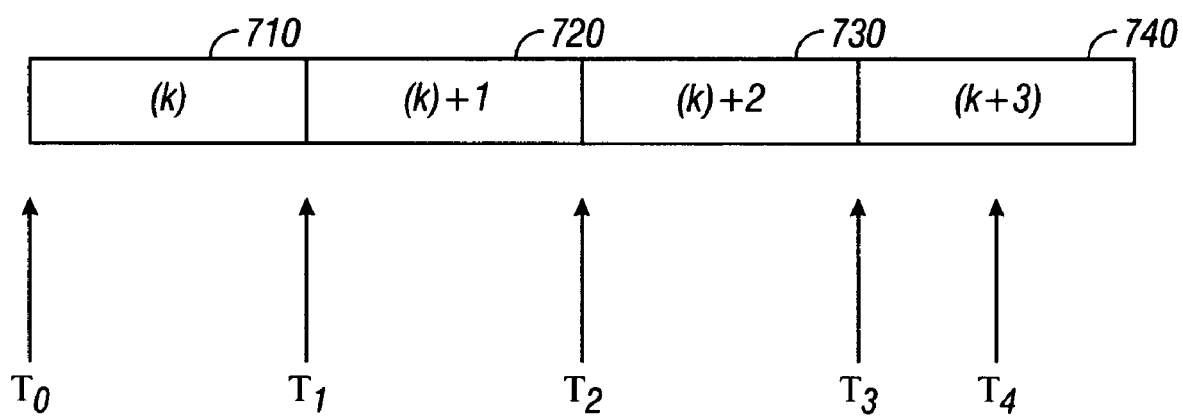
FIG. 7 is a block diagram depicting a portion of the Power Warning Failure algorithm of FIG. 6.

Referring now to FIG. 7, converted DMA data payloads 710, 720, and 730, comprising the (k)th, the (k)+1th, and the (k)+2th converted DMA data payloads are In Flight and remain outstanding in the inflight queue. The (k)th converted DMA data payload was transmitted at time $T_0$. The (k)+1th converted DMA data payload was transmitted at time $T_1$. The (k)+2th converted DMA data payload was transmitted at time $T_2$.

At time $T_3$, Applicants' method began transmitting the (k)+3th converted DMA data payload, i.e. converted payload 740, to the storage device. While transmitting the converted DMA data payload 740, a PFW signal is received at time $T_4$ prior to completing the transmission of converted payload 740.

Using Applicants' Power Failure Warning algorithm of FIG. 6, in step 625 Applicants' method completes transmission of the converted DMA data payload 740, and in step 635 Applicants' method places converted DMA data payload 740 to In Flight status.

While Applicants' method is performing steps 625 and 635, Applicants' method in step 640 is simultaneously tracking the status of inflight converted DMA data payloads 710, 720, and 730, to one or more target data storage devices.

Referring again to FIG. 6, in step 650 Applicants' method determines if the PFW time interval has expired. In certain embodiments, step 650 is performed by a sector format conversion device, such as device 220 (FIG. 2). If Applicants' method determines in step 650 that the PFW time interval has not expired, then the method transitions from step 650 to step 640 and continues.

Alternatively, if Applicants' method determines in step 650 that the PFW time interval has expired, then the method transitions from step 650 to step 660 wherein the method saves each converted DMA payload remaining In Flight at the expiration of the PFW time interval.

In certain embodiments, step 660 is performed by a sector format conversion device, such as device 220 (FIG. 2). In certain embodiments, the In Flight converted DMA data payloads stored in step 660 are written to nonvolatile memory, such as memory 226, disposed in a sector format conversion device, such as device 220. In certain embodiments, the In Flight converted DMA data payloads stored in step 660 are written to nonvolatile memory, such as memory 214, disposed in a device controller, such as device controller 210.

In step 670, utility power is restored to Applicants' information storage and retrieval system. By "utility power," Applicants mean power continuously provided by a commercial and/or captive power generator generation facility external to Applicants' information storage and retrieval system.

In step 680, Applicants' method retrieves the In Flight converted DMA data payloads saved in step 660. In certain embodiments, step 680 is performed by a controller, such as controller 210, interconnected with the data cache, such as data cache 134, and interconnected with one or more sector format conversion devices, such as device 220. In other embodiments, step 680 is performed by one or more sector format conversion devices.

Applicants' method transitions from step 680 to step 690 wherein the method provides to the data storage device the converted DMA data payloads retrieved in step 680. Applicants' method transitions from step 690 to step 430 and continues as described above.

The embodiments of Applicants' method recited in FIGS. 3, 4, and/or 6, may be implemented separately. Moreover, in certain embodiments, individual steps recited in FIGS. 3, 4, and/or 6, may be combined, eliminated, or reordered.

In certain embodiments, Applicants' invention includes instructions residing in memory, such as for example memory 214 (FIG. 2), memory 226 (FIG. 2), memory 246 (FIG. 2), memory 266 (FIG. 2), and/or memory 286 (FIG. 2), where those instructions are executed by processor 212 (FIG. 2), 224 (FIG. 2), 244 (FIG. 2), 264 (FIG. 2), and/or 284 (FIG. 2), respectively, to performs steps 310, 320, 330, and 340, recited in FIG. 3, and/or steps 410, 420, 430, 440, 450, 460, 470, 480, and/or 490, recited in FIG. 4, and/or steps 610, 620, 625, 630, 635, 640, 650, 660, 670, 680, and/or 690, recited in FIG. 6.

In other embodiments, Applicants' invention includes instructions residing in any other computer program product, where those instructions are executed by a computer external to, or internal to, system 100, to perform steps 310, 320, 330, and 340, recited in FIG. 3, and/or steps 410, 420, 430, 440, 450, 460, 470, 480, and/or 490, recited in FIG. 4, and/or steps 610, 620, 625, 630, 635, 640, 650, 660, 670, 680, and/or 690, recited in FIG. 6. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to convert data payloads from a first sector format to a second sector format, comprising the steps of:
   providing an information storage and retrieval system which includes information comprising a plurality of first sectors written in a first sector format; a device controller; a data storage device, wherein said data storage device comprises an information storage medium comprising a plurality of second sectors each comprising a second sector format; a sector format conversion device comprising a data queue, a buffer, and nonvolatile memory; a communication link interconnecting said sector format conversion device and said device controller; wherein said sector format conversion devices is interconnected with said data storage device;
   providing a plurality of Inflight Indicators, wherein each Inflight Indicator comprises either a first value or a second value, and wherein the (i)th Inflight Indicator is associated with the (i)th converted DMA data payload;
   setting a power failure warning time interval;
   forming a plurality of DMA data payloads each comprising a plurality of first sectors, wherein each of said plurality of DMA data payloads comprises a beginning logical block address and an ending logical block address;

sending to said sector format conversion device one or more of said DMA data payloads;

overlaying by said sector format conversion device the (i)th DMA data payload onto part or all of a plurality of second sectors to form the (i)th converted DMA data payload;

enqueuing said (i)th converted DMA data payload in said data queue;

transmitting said (i)th converted DMA data payload to said data storage device;

setting the (i)th Inflight Indicator to a second value when transmitting said (i)th converted DMA data payload to said data storage device;

writing said (i)th converted DMA data payload to said information storage medium;

generating the (i)th Write Complete Signal by said data storage device after writing said (i)th converted DMA data payload to said information storage medium;

resetting the (i)th Inflight Indicator to said first value upon receiving the (i)th Write Complete Signal;

determining if a power failure warning has been received;

operative if a power failure warning is received:

starting said power failure warning time interval;

providing one or more converted DMA data payloads from said queue to said data storage device during said power failure warning time interval, wherein said queue includes (P) enqueued converted DMA data payloads;

determining if said power failure warning time interval is expired;

operative if said power failure warning time interval is expired;

determining if the (j)th converted DMA data payload has been written to said information storage medium, wherein (j) is greater than or equal to 1 and less than or equal to (P);

operative if the (j)th converted DMA data payload has not been written to said information storage medium at the expiration of said power failure warning time interval, saving the (j)th converted DMA data payload in nonvolatile memory;

losing utility power to said information storage and retrieval system;

restoring utility power to said information storage and retrieval system;

determining that (Q) converted DMA payloads remained In Flight at the time of utility power loss;

retrieving from said nonvolatile memory each converted DMA data payload that was not written to said information storage medium prior to loss of utility power; and providing to said data storage device each converted DMA data payload that was not written to said information storage medium prior to loss of utility power.

2. The method of claim 1, further comprising the steps of:
completing the transmission of an already-converted DMA data payload to said data storage device, wherein said power failure warning was received during that transmission;
setting an Inflight Indicator for that transmitted, already-converted DMA data payload.

3. The method of claim 1, further comprising the steps of:
upon restoration of utility power to said information storage and retrieval system, determining if the (k)th Inflight Indicator is set to said second value;

operative if the (k)th Inflight Indicator is set to said second value, retrieving the (k)th converted DMA data payload from said nonvolatile memory.

4. The method of claim 1, further comprising the step of selecting said first sector format from the group consisting of 520 byte sectors, 524 byte sectors, and 528 byte sectors.

5. The method of claim 1, further comprising the step of setting said second sector format to comprise 512 byte sectors.

6. The method of claim 1, further comprising the step of setting said power failure warning time interval equal to about 3 milliseconds.

7. The method of claim 1, further comprising the step of providing a device controller comprising a RAID controller.

8. The method of claim 1, further comprising the step of providing a S-ATA data storage device.

9. The method of claim 5, further comprising the step of providing utility power to said information storage and retrieval system for 4 milliseconds or longer after receiving said power failure warning.

10. An article of manufacture comprising a computer useable medium having computer readable program code disposed therein to convert data payloads from a first sector format to a second sector format, said article of manufacture further comprising information comprising a plurality of first sectors written in a first sector format, a device controller, a data storage device, wherein said data storage device comprises an information storage medium comprising a plurality of second sectors each comprising a second sector format, a sector format conversion device comprising a data queue, a buffer, and nonvolatile memory, a communication link interconnecting said sector format conversion device and said device controller , wherein said sector format conversion devices is interconnected with said data storage device, the computer readable program code comprising a series of computer readable program steps to effect:

forming a plurality of DMA data payloads each comprising a plurality of first sectors, wherein each of said plurality of DMA data payloads comprises a beginning logical block address and an ending logical block address;

sending to said sector format conversion device one or more of said plurality of DMA data payloads;

overlaying by said sector format conversion device the (i)th DMA data payload onto part or all of a plurality of second sectors to form the (i)th converted DMA data payload;

enqueuing said (i)th converted DMA data payload in said data queue;

transmitting said (i)th converted DMA data payload to said data storage device;

writing said (i)th converted DMA data payload to said information storage medium;

determining if a power failure warning has been received;

operative if a power failure warning is received;

obtaining a power failure warning time interval;

starting said power failure warning time interval;

providing one or more converted DMA data payloads from said data queue to said data storage device during said power failure warning time interval, wherein said data queue includes (P). converted DMA data payloads;

determining if said power failure warning time interval is expired;

operative if said power failure warning time interval is expired;

determining if the (j)th converted DMA data payload has been written to said information storage medium, wherein (j) is greater than or equal to 1 and less than or equal to (P);

operative if the (j)th converted DMA data payload has not been written to said information storage medium at the expiration of said power failure warning time interval, saving the (j)th converted DMA data payload in nonvolatile memory;

upon restoration of utility power to said information storage and retrieval system, retrieving from nonvolatile memory each converted DMA data payload that was not written to said information storage medium prior to loss of utility power; and providing to said data storage device each converted DMA data payload that was not written to said information storage medium prior to loss of utility power.

11. The article of manufacture of claim 10, said computer readable program code further comprising a series of computer readable program steps to effect:

completing the transmission of an already-converted DMA data payload to said data storage device, wherein said power failure warning was received during that transmission;

setting an Inflight Indicator for that transmitted, already-converted DMA data payload.

12. The article of manufacture of claim 10, said computer readable program code further comprising a series of computer readable program steps to effect:

upon restoration of utility power to said information storage and retrieval system, determining if the (k)th Inflight Indicator is set to said second value;

operative if the (k)th Inflight Indicator is set to said second value, retrieving the (k)th converted DMA data payload.

13. The article of manufacture of claim 10, said computer readable program code further comprising a series of computer readable program steps to effect selecting said first sector format from the group consuming of 520 byte sectors, 524 byte sectors, and 528 byte sectors.

14. The article of manufacture of claim 10, said computer readable program code further comprising a series of computer readable program steps to effect setting said second sector format to comprise 512 byte sectors.

15. The article of manufacture of claim 10, said computer readable program code further comprising a series of computer readable program steps to effect setting said power failure warning time interval equal to about 3 milliseconds.

16. The article of manufacture of claim 10, wherein said device controller comprises a RAID controller.

17. The article of manufacture of claim 10, wherein said data storage device comprises a S-ATA device.

18. A computer program product usable with a programmable computer processor having computer readable program code embodied therein to convert data payloads from a first sector format to a second sector format in an information storage and retrieval system comprising information comprising a plurality of first sectors written in a first sector format a device controller, a data storage device, wherein said data storage device comprises an information storage medium comprising a plurality of second sectors each comprising a second sector format, a sector format conversion device comprising a data queue, a buffer, and nonvolatile memory, a communication link interconnecting said sector format conversion device and said device controller, wherein said sector format conversion devices is interconnected with said data storage device, comprising:

computer readable program code which causes said programmable computer processor to form a plurality of DMA data payloads each comprising a plurality of first sectors, wherein each of said plurality of DMA data payloads comprises a beginning logical block address and an ending logical block address;

computer readable program code which causes said programmable computer processor to send to said sector format conversion device said one or more of said plurality of DMA data payloads;

computer readable program code which causes said programmable computer processor to overlay by said sector format conversion device the (i)th DMA data payload onto part or all of a plurality of second sectors to form the (i )th converted DMA data payload;

computer readable program code which causes said programmable computer processor to enqueue said (i)th converted DMA data payload in said data queue;

computer readable program code which causes said programmable computer processor to transmit said (i)th converted DMA data payload to said data storage device;

computer readable program code which causes said programmable computer processor to write said (i)th converted DMA data payload to said information storage medium;

computer readable program code which causes said programmable computer processor to determine if a power failure warning has been received;

computer readable program code which, if a power failure warning is received causes said programmable computer processor to:

obtain a power failure warning time interval;

start said power failure warning time interval;

provide one or more converted DMA data payloads from said data queue to said data storage device during said power failure warning time interval, wherein said data queue includes (P) converted DMA data payloads;

determine if said power failure warning time interval is expired;

computer readable program code which, if said power failure warning time interval is expired causes said programmable computer processor to:

determine if the (j)th converted DMA data payload has been written to said information storage medium, wherein (j) is greater than or equal to 1 and less than or equal to (P);

computer readable program code which, if the (j)th converted DMA data payload has not been written to said information storage medium at the expiration of said power failure warning time interval, causes said programmable computer processor to save the (j)th converted DMA data payload in nonvolatile memory;

computer readable program code which, after restoration of utility power, causes said programmable computer processor to retrieve each converted DMA data payload that was not written to said information storage medium prior to loss of utility power; and computer readable program code which causes said programmable computer processor provide to the data storage device each converted DMA data payload that was not written to said information storage medium prior to loss of utility power.

19. The computer program product of claim 18, further comprising:

computer readable program code which causes said programmable computer processor to complete the transmission of an already-converted DMA data payload to said data storage device, wherein said power failure warning was received during that transmission;

computer readable program code which causes said programmable computer processor to set an Inflight Indicator for that transmitted, already-converted DMA data payload.

20. The computer program product of claim 18, further comprising:

computer readable program code which, after restoration of utility power to said information storage and retrieval system, causes said programmable computer processor to determine if the (k)th Inflight Indicator is set to said second value;

computer readable program code which, if the (k)th Inflight Indicator is set to said second value, causes said programmable computer processor to retrieve the (k)th converted DMA data payload.

21. The computer program product of claim 18, further comprising computer readable program code which causes said programmable computer processor to select said first sector format from the group consisting of 520 byte sectors, 524 byte sectors, and 528 byte sectors.

22. The computer program product of claim 18, computer readable program code which causes said programmable computer processor to set said second sector format to comprise 512 byte sectors.

23. The computer program product of claim 18, further comprising computer readable program code which causes said programmable computer processor to set said power failure warning time interval equal to about 4 milliseconds.

24. The computer program product of claim 18, wherein said device controller comprises a RAID controller.

25. The computer program product of claim 18, wherein said data storage device comprises a S-ATA device.

* * * * *